United States Patent [19]

Hallstrom

[11] 4,144,963
[45] Mar. 20, 1979

[54] RECIPROCATING CONVEYOR

[76] Inventor: Olof A. Hallstrom, 1350 Hallstrom Rd., Tillamook, Oreg. 97141

[21] Appl. No.: 496,523

[22] Filed: Aug. 12, 1974

[51] Int. Cl.² ............................................. B65G 25/04
[52] U.S. Cl. ..................................... 198/750; 198/775
[58] Field of Search ................. 198/218, 195, 219, 76, 198/24, 195, 750, 773–775; 214/83.24, 83.3, 1 BB; 49/425, 468, 49, 214; 308/3.5

[56] References Cited

U.S. PATENT DOCUMENTS

| | | | |
|---|---|---|---|
| 1,676,311 | 7/1928 | Zimmermann | 308/3.5 |
| 2,629,504 | 2/1953 | Peterson | 214/83.3 |
| 2,912,714 | 11/1959 | Rich | 49/425 |
| 2,913,046 | 11/1959 | Sharp et al. | 49/425 |
| 2,973,856 | 3/1961 | Brooks | 198/219 |
| 3,248,822 | 5/1966 | Sincock | 49/425 |
| 3,309,816 | 3/1967 | Malone, Jr. | 49/425 |
| 3,534,875 | 10/1970 | Hallstrom, Jr. | 198/218 X |

FOREIGN PATENT DOCUMENTS

| | | | |
|---|---|---|---|
| 1242249 | 12/1959 | France | 198/195 |
| 1499388 | 10/1967 | France | 49/425 |
| 488669 | 7/1938 | United Kingdom | 214/83.3 |

*Primary Examiner*—Robert B. Reeves
*Assistant Examiner*—Jeffrey V. Nase
*Attorney, Agent, or Firm*—Oliver D. Olson

[57] ABSTRACT

At least one group of at least three elongated slats are mounted side by side on a frame for longitudinal reciprocation to form a conveyor, the slats being connected to adjustable drive mechanism which is operable in a first position of adjustment such that there are always a greater number of slats of each group moving simultaneously in a conveying direction, with the remaining slat or slats of each group moving in the opposite direction, and in a second position of adjustment such that all of the slats of each group move simultaneously in the conveying direction, to initiate movement of a load to be conveyed, whereupon the drive mechanism is adjusted to said first position of adjustment. In one embodiment of the invention, elongated flexible seals are provided between adjacent pair of slats, each seal being secured to one of the slats of the pair and slidably engaging the other slat of the pair, whereby to form a substantially non-porous conveyor. In another embodiment the slats are arranged to provide between adjacent slats a spacing which increases progressively in a conveying direction, whereby the conveyor functions additionally as a particle separator.

16 Claims, 11 Drawing Figures

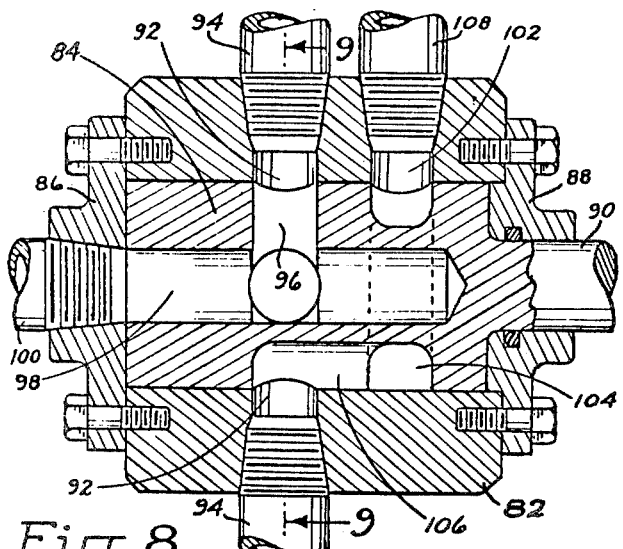
Fig. 8.
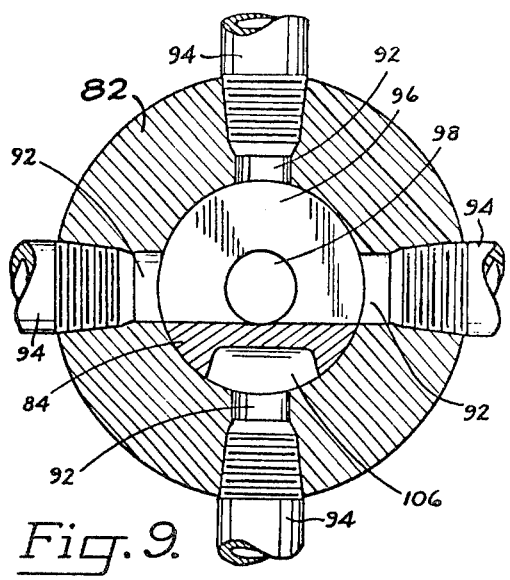
Fig. 9.
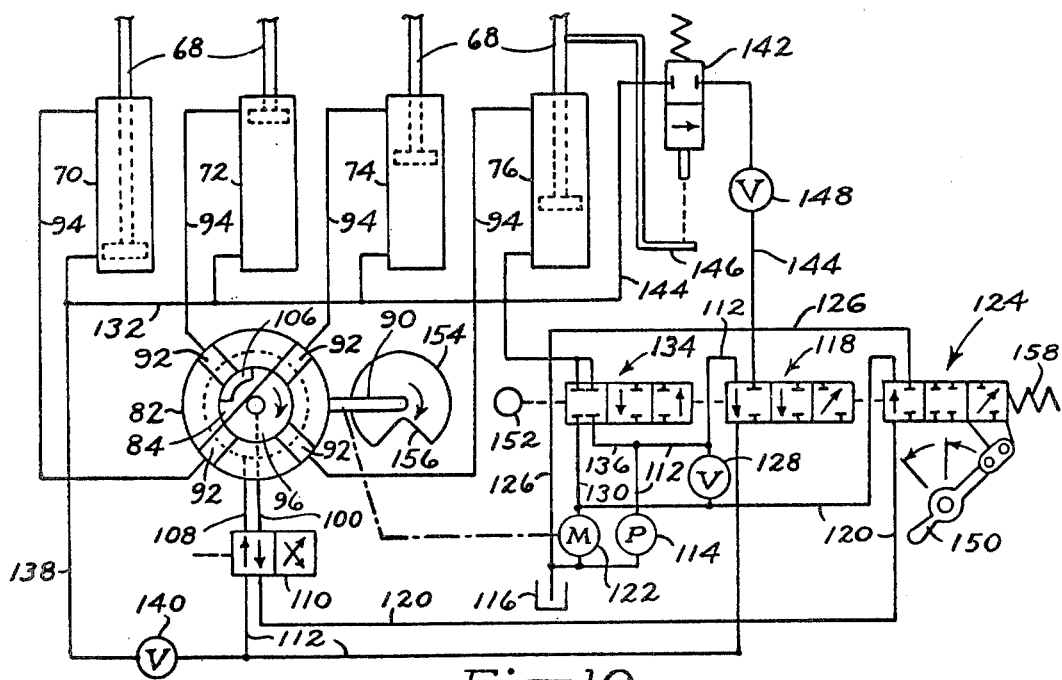
Fig. 10.
Fig. 1.

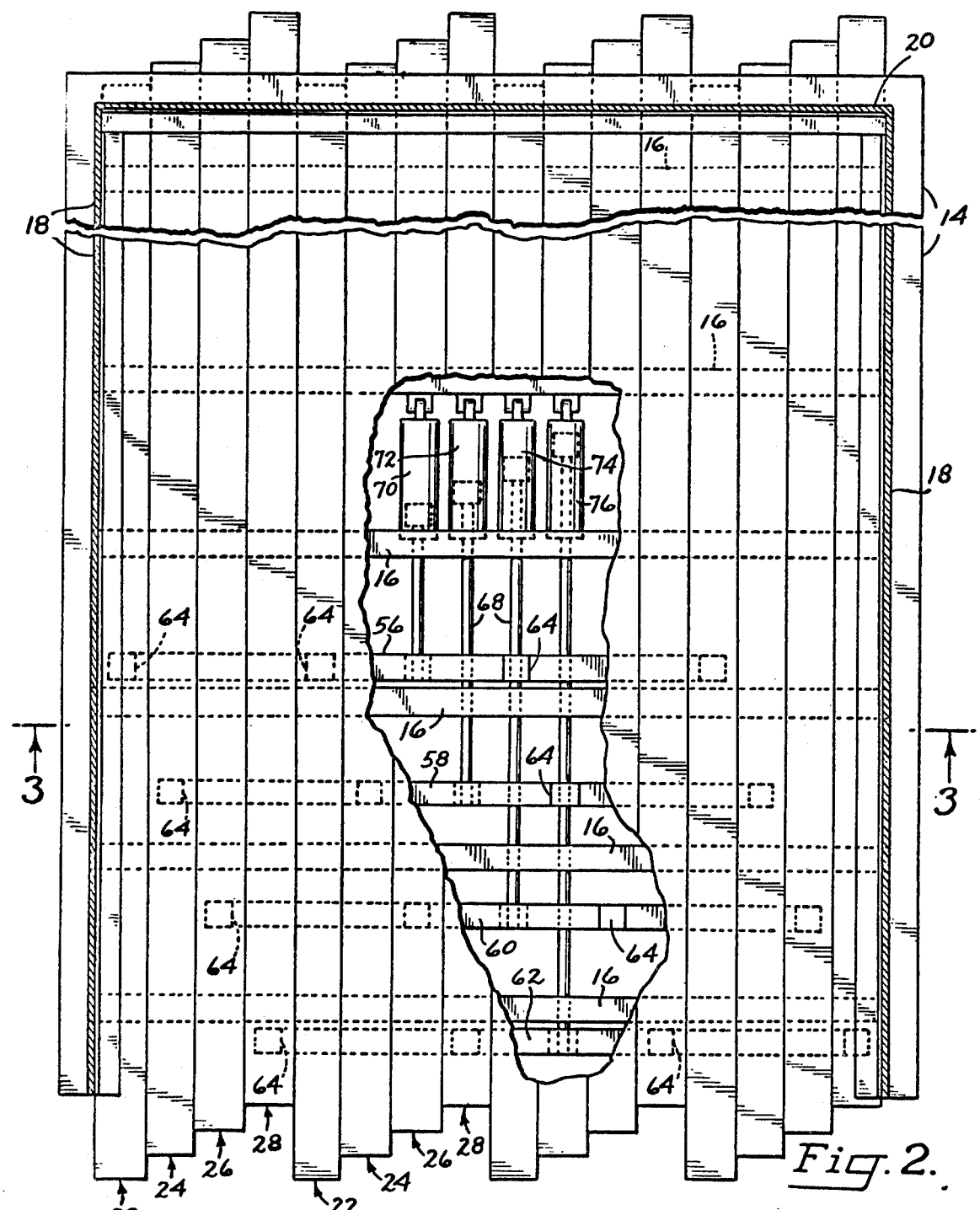
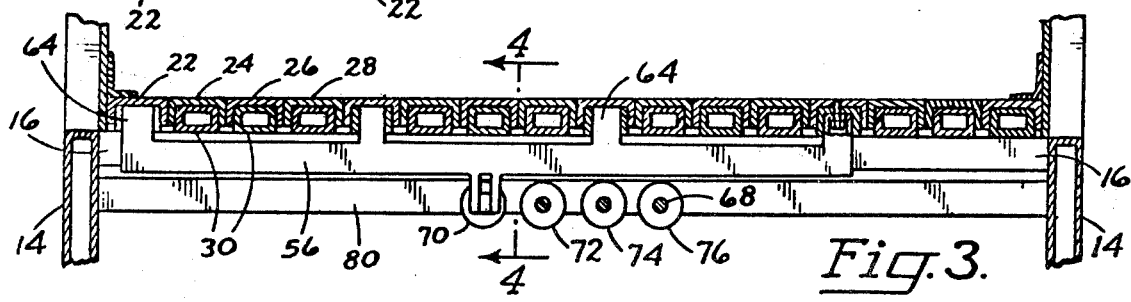

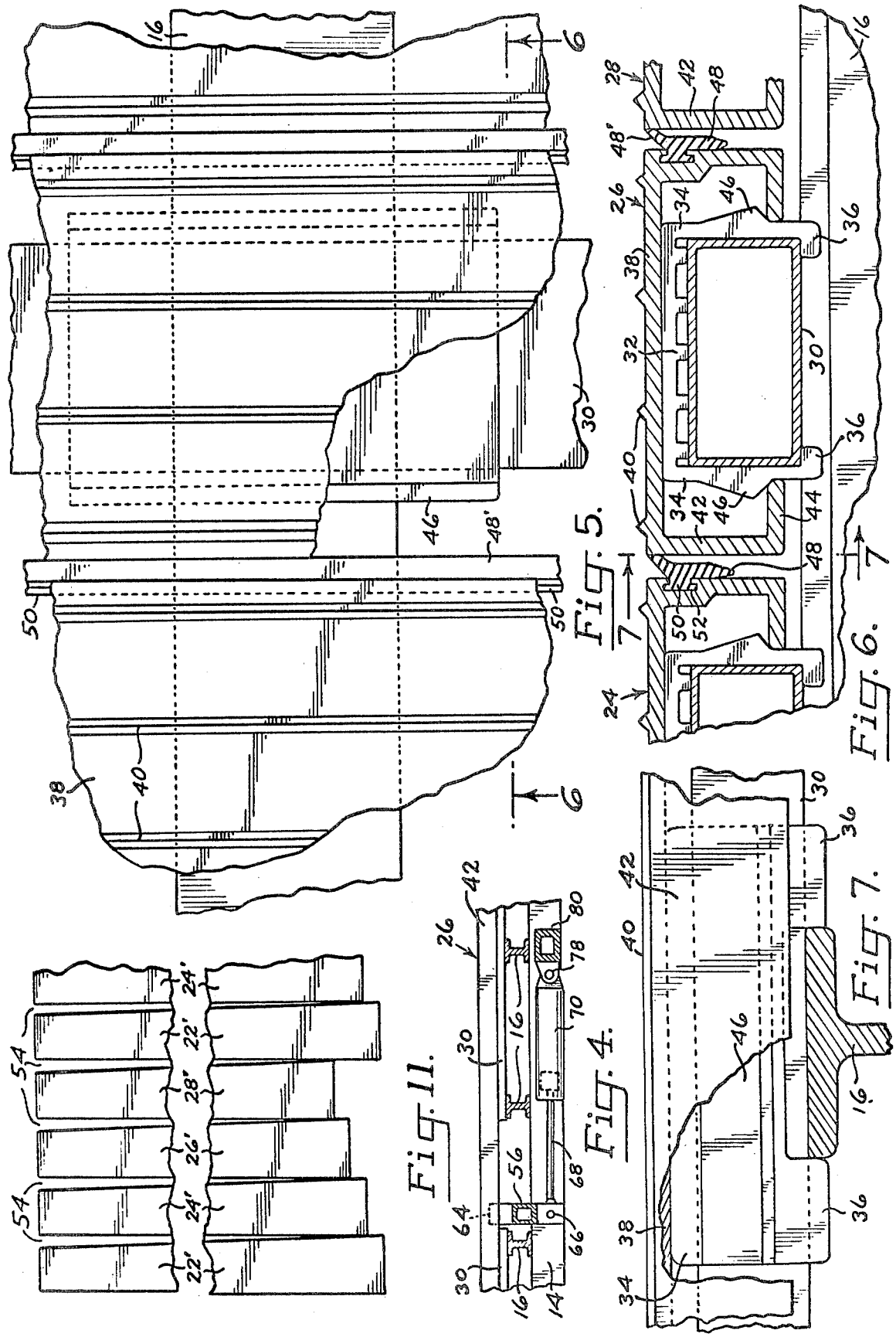

RECIPROCATING CONVEYOR

BACKGROUND OF THE INVENTION

This invention relates to reciprocating conveyors, and more particularly to a reciprocating conveyor which operates efficiently to provide continuous movement of material deposited thereon.

Reciprocating slat type conveyors provided heretofore generally utilize groups of two slats with the slats of each group moving vertically and horizontally relative to each other, or with the slats of each group moving simultaneously in one direction and sequentially in the opposite direction. These arrangements provide a step-wise movement of material. In many instances, a step-wise advance of the material is followed by partial retraction of the material. In any case, such arrangements are wasteful of conveyor drive power and are slow and inefficient in operation.

The foregoing disadvantages are overcome by the reciprocating conveyor described in my earlier U.S. Pat. No. 3,534,875. However, my earlier conveyor is limited in its mode of operation by its inability to initiate movement of some types of loads to be conveyed, is not completely non-porous to certain materials and requires more than desired time and labor for assembly, maintenance and repair.

SUMMARY OF THE INVENTION

In its basic concept, the reciprocating conveyor of this invention includes a plurality of elongated conveyor slats disposed side by side and arranged to provide either a substantially non-porous conveyor or a variable spacing between slats to provide a combination conveyor and particle separator, and also includes drive mechanism which is operable in a first position of adjustment to effect movement of more than half of the slats simultaneously in a conveying direction while the remaining minority of slats move in the opposite direction, and in a second position of adjustment to effect movement of all of the slats simultaneously in the conveying direction and sequential movement of the slats in the opposite direction.

It is by virtue of the foregoing basic concept that the principal objective of this invention is achieved; namely, to overcome the aforementioned disadvantages of prior reciprocating slat type conveyors.

Another important object of this invention is the provision of a reciprocating conveyor of the class described which may be utilized in industrial conveyor applications as well as providing a truck bed capable of operation to load material onto the truck and to unload material from the truck.

A further important object of this invention is to provide a reciprocating conveyor of the class described which may be utilized as a combination conveyor and particle separator.

Still another important object of this invention is the provision of a reciprocating conveyor of the class described which includes simplified means by which a plurality of elongated slats is assembled upon a frame for reciprocative movement with minimum frictional resistance.

A still further important object of this invention is the provision of a reciprocating conveyor of the class described which incorporates a unique hydraulic drive mechanism.

Still another important object of this invention is the provision of a reciprocating conveyor of the class described which includes novel means for sealing the space between adjacent slats.

A further important object of this invention is the provision of a reciprocating conveyor of the class described which is of simplified construction for economical manufacture and is capable of long service life with minimum maintenance and repair.

The foregoing and other objects and advantages of this invention will appear from the following detailed description, taken in connection with the accompanying drawings of preferred embodiments.

BRIEF DESCRIPTION OF THE DRAWINGS

FIG. 1 is a side elevation of a truck having incorporated therewith a reciprocating conveyor truck bed embodying the features of this invention.

FIG. 2 is a foreshortened plan view of the bed of the truck illustrated in FIG. 1, a portion being broken away to disclose details of construction.

FIG. 3 is a fragmentary sectional view taken on the line 3—3 of FIG. 2.

FIG. 4 is a fragmentary sectional view taken on the line 4—4 in FIG. 3.

FIG. 5 is a fragmentary plan view of the truck bed on an enlarged scale.

FIG. 6 is a fragmentary sectional view taken on the line 6—6 of FIG. 5.

FIG. 7 is a fragmentary sectional view taken on the line 7—7 in FIG. 6.

FIG. 8 is a longitudinal section of an hydraulic control valve embodying features of this invention.

FIG. 9 is a fragmentary sectional view taken on the line 9—9 in FIG. 8.

FIG. 10 is a schematic diagram of an hydraulic drive system embodying the features of this invention.

FIG. 11 is a fragmentary, foreshortned plan view showing an assembly of conveyor slats arranged to function additionally as a particle separator.

DESCRIPTION OF THE PREFERRED EMBODIMENTS

Although the reciprocating conveyor of this invention can be utilized per se in a variety of industrial applications, it has particular utility in forming the load supporting bed of a truck. Thus, there is shown in FIG. 1, for purposes merely of illustration, a truck of the semi type which includes a powered tractor 10 and a semi-mounted trailer 12. The trailer includes a frame which comprises side beams 14 interconnected by transverse beams 16. The frame supports upstanding side walls 18, front wall 20 and a load supporting bed. In accordance with this invention, the load supporting bed is of the reciprocating slat type conveyor now to be described.

The conveyor type truck bed comprises a plurality of groups of elongated slats extending longitudinally of the truck in the direction of conveying movement and arranged side by side transversely of the trailer. In the embodiment illustrated (FIG. 2) each group consists of four slats 22, 24, 26 and 28, although it is to be understood that each group may include any desired number in excess of two.

Supported by the transverse frame beams 16 and extending longitudinally of the trailer are a plurality of laterally spaced guide beams 30. These are illustrated as box beams, and they are secured to the transverse frame beams 16 as by welding.

Each of the elongated conveyor slats is mounted on a guide beam 30 (FIG. 6) for longitudinal reciprocating relative thereto. In the embodiment illustrated, this mounting is provided by means which minimizes frictional resistance to said reciprocation. Thus, a plurality of anti-friction bearings are mounted on each guide beam, one at each transverse frame beam 16. For this purpose, each bearing is made of synthetic thermoplastic resin such as Teflon, Delrin, polyethylene, etc., or other suitable material having a low coefficient of friction. It is substantially U-shape in cross section, having a top wall 32 and laterally resilient side walls 34, to overlap the top and sides of the guide beam 30. The length of the bearing is greater than the width of the underlying transverse frame beam 16, and each of the opposite side walls 34 of the bearing is provided with a pair of downwardly and inwardly extending lugs 36 spaced apart a distance slightly greater than the width of the underlying transverse frame beam 16. The side of the bearing being laterally flexible, it may be installed upon the guide beam by spreading the sides apart and forcing it downward over the guide beam until the lugs 36 clear the bottom side of the guide beam on opposite side of the transverse frame beam 16. The lugs then snap inwardly under the guide beam, on opposite sides of the beam 16, to secure the bearing against vertical and longitudinal displacement.

Each slat is substantially C-shaped in cross section, having a top wall 38 preferably provided with a plurality of longitudinal friction-reducing load-supporting ribs 40, laterally spaced side walls 42 and laterally spaced bottom guide flanges 44. It is wider than the bearing and its height is less than the distance between the upper surface of the top wall 32 of the bearing and the upper surface of the underlying transverse frame beam 16. The pair of guide flanges 44 project inward from each of the opposite side walls 42 of the slat and define between their inner edges a longitudinal opening throughout the length of the slat. The width of this opening is slightly greater than the outside width of the bearing.

The opposite side walls 34 of each bearing are provided with longitudinal ribs 46 which project laterally outward in an area intermediate the vertical height of the bearing side walls and inwardly of the bottom flanges 44 when the top surface 38 of the slat rests upon the top surface 32 of the bearing. The distance between the ribs is greater than the width of the opening between the flanges 44. However, the ribs are resilient and hence allow the slat to be installed upon the bearing by pushing downward on the slat to cause the flange 44 to move downward past the ribs. The resilient ribs then recover their normal, expanded contour, overlying the inner surfaces of the flanges and thereby preventing upward displacement of the slat relative to the bearing while permitting longitudinal reciprocating of the slat relative to the bearing, with minimum frictional resistance.

The foregoing construction of bearings and slats greatly facilitates assembly of the conveyor and disassembly of a slat for replacement of worn bearings. The construction also minimizes the cost of manufacture of the slats and bearings, since it allows formation of the slats by the economical extrusion of aluminum or other suitable material and the formation of the bearings by the extrusion of thermoplastic resin.

In one embodiment of this invention it is desirable that the arrangement of slats provide a substantially non-porous conveyor, so as to accommodate conveying of particulate material. For this purpose, novel means is provided for sealing the space between adjacent slats. Referring particularly to FIG. 6 of the drawings, an elongated strip 48 of flexible material is secured removably to one side of each slat. This attachment is provided, in the embodiment illustrated, by forming the strip with a laterally projecting dove-tail section 50 and the corresponding side of the slat is provided with a matching dove-tail groove 52. The sealing strip thus is secured removably to the slat by sliding the dove-tail section longitudinally into the groove.

The sealing strip has an upper portion 48' which extends angularly upward and outward for sliding contact with the confronting side of the adjacent slat, preferably near the upper edge thereof. This resilient engagement forms an effective seal between adjacent slats while permitting relative reciprocation thereof. Further, the weight of particulate material being conveyed on the slats tends to force the upper portion 48' of the flexible sealing strip into positive, sliding engagement with the adjacent slat, to insure maintenance of the seal.

The conveyor of this invention also may be arranged to function as a particle separator. FIG. 11 illustrates a structural arrangement accommodating this dual purpose. In this arrangement, the slats 22', 24', 26' and 28' are tapered longitudinally to smaller width at the outfeed end and the seals 48 previously described are omitted. The spacing 54 between adjacent slats thus increases progressively toward the outfeed end of the conveyor. Accordingly, by the reciprocative motion of the slats previously described, particulate material of diverse sizes deposited on the infeed end of the conveyor progresses toward the outfeed and falls by gravity through the variable spacing between adjacent slats. Thus, the smallest sizes of particulate material will be separated adjacent the infeed end of the conveyor, wherein the spacing between adjacent slats is a minimum, and the largest sizes of particulate material will be separated adjacent the outfeed end of the conveyor, wherein the spacing between adjacent slats is a maximum. A plurality of off-bearing conveyors, or receptacles, may be positioned below the conveyor to receive the various size fractions of particulate material thus separated.

In accordance with this invention, drive mechanism is provided for reciprocating the slats, preferably selectively in either of two predetermined modes. In the primary mode the drive mechanism operates in such manner that more than half of the slats are moved simultaneously in a conveying direction while the remaining slats are moved in the opposite direction. In the secondary mode, the drive mechanism is operated in such manner that all of the slats are moved simultaneously in a conveying direction. This mode is found desirable in order to initiate movement of some types of loads. Thereafter, the drive mechanism is altered to operate in the primary mode.

As indicated hereinbefore, the conveyor of this invention includes at least one group of at least three elongated slats arranged side by side and supported for independent longitudinal reciprocation. In the embodiment illustrated, each group includes four slats and the truck bed (FIGS. 2 and 3) includes four such groups. Accordingly, one slat of each group is interconnected for simultaneous longitudinal reciprocation. For this purpose, four transverse drive beams 56, 58, 60 and 62 underlie the slat intermediate certain of the transverse frame beams 16 between which portions of the longitudinal guide beams 30 have been cut away (FIG. 4). Each drive beam is provided with four laterally spaced brackets 64 which extend upward through the central bottom openings in the associated slats for attachment to the latter, as by means of screws. Each transverse beam is secured to a different one of the slats of each group making up the conveyor bed. Thus, in the embodiment illustrated, the slats 22, 24, 26 and 28 of each of the four groups are secured to the beams 55, 58, 60 and 62 respectively, for simultaneous movement therewith.

Each of the transverse drive beams is connected to a source of power for independent reciprocative movement in the longitudinal direction of the conveyor. In the embodiment illustrated, the drive beams 56, 58, 60 and 62 are connected pivotally, as by pivot pins 66 (FIG. 4), to the projecting ends of piston rods 68 extending from fluid pressure cylinders 70, 72, 74 and 76, respectively. The ends of the cylinders opposite the piston rods are mounted pivotally, as by pivot pins 78, to a transverse frame member 80 secured at its opposite ends to the side beams 14 of the trailer frame.

The inner ends of the piston rods 68 are connected to pistons which are reciprocative in the cylinders, upon application of fluid pressure, preferably hydraulic, selectively to the opposite ends of the cylinders.

FIG. 10 of the drawings illustrates an hydraulic system associated with the cylinders for effecting selective reciprocation of the pistons and piston rods. This hydraulic system includes an hydraulic control valve the construction of which is shown in detail in FIGS. 8 and 9. The control valve includes a stationary body 82 having a central longitudinal bore in which a valve spool 84 is mounted for axial rotation. End caps 86 and 88 on the opposite ends of the body confine the spool therebetween. The end cap 88 is provided with an axial bore for outward extension therethrough of a drive shaft 90 connected at its inner end to the spool 84.

The valve body 82 is provided with a plurality of circumferentially spaced, radial passageways 92 each communicating through a flexible conduit 94 with a different one of the cylinders, at the piston rod ends thereof. Since four cylinders are employed in the embodiment illustrated, there are four such passageways in the valve body. Further, since it is a requirement of this invention that more than half of the slats of each group of slats be movable simultaneously in a conveying direction while the remaining slat or slats of each group move in the opposite direction, it follows that three of the slats of each group of four must always be movable simultaneously in the conveying direction. Accordingly, a segment of the spool 84 is cut away to provide a common passageway 96 registering with three of the four passageways 92 in the body. This common passageway communicates with an axial passageway 98 in the spool 84. This axial passageway communicates with one end of a flexible conduit 100 secured to the end cap 86 of the body opposite the spool drive shaft 90.

The valve body 82 also is provided with an additional radial passageway 102 which communicates with an annular passageway 104 in the spool 84. A longitudinal passageway 106 in the spool communicates this annular passageway with the remaining one of the four passageways 92 in the body, i.e. the passageway not communicating with the common passageway 96.

Referring again to FIG. 10 of the drawings, the passageway 102 in the valve body communicates through a flexible conduit 108 with a two-way valve 110, as does the axial passageway 98 in the spool through conduit 100. The valve 110 may be operated by hand, by electric solenoid, or by other suitable means. This valve also communicates through a conduit 112 with the pressure outlet of an hydraulic pump 114 driven by a suitable motor (not shown). The inlet of the pump communicates with a reservoir tank 116. Interposed in the conduit 112 is a three-position valve 118 the function of which is described in detail hereinafter.

The valve 110 also communicates through a conduit 120 with the inlet of an hydraulic motor 112. The spool drive shaft 90 is coupled to the rotary output shaft of the hydraulic motor, as indicated by the broken line in FIG. 10. This coupling may be provided by interengaging gears, by sprockets and chain, or other suitable means. The outlet of motor 122 communicates with the tank 116. Interposed in the conduit 120 is a second three-position valve 124 the function of which is described in detail hereinafter. The second valve also controls communication between the conduit 120 and a conduit 126 communicating with the tank 116.

A relief valve 128 interconnects the pump outlet and motor inlet, through conduit 112 upstream from valve 118 and through conduit 120 downstream from valve 124, for purposes described more fully hereinafter.

The motor inlet also communicates through a conduit 130 with a common conduit 132 to which the piston head ends of the four cylinders 70, 72, 74 and 76 are connected. Interposed in the conduit 130 is a third three-position valve 134 the function of which is described in detail hereinafter. This valve also controls communication of a conduit 136 between the common conduit 132 and the pump inlet.

A bypass conduit 138, provided with a bleed valve 140, communicates the common conduit 132 with the pressure conduit 112 upstream from the two-way valve 110. The bleed valve limits the flow of fluid in conduit 138 to substantially less than the output flow from pump 114.

A two-way relief valve 142 controls communication of a conduit 144 between the common conduit 132 and the conduit 126 leading to the tank 116. This valve normally is maintained in the closed position illustrated, as by means of a spring, and is moved to open position by an arm 146 connected to one of the piston rods 68 when the latter reaches a predetermined position of extension from its associated cylinder 76. A bleed valve 148 in the conduit 144 restricts the flow of fluid in the latter to substantially less than the output flow from pump 114, but to a flow somewhat greater than the flow through bleed valve 138. If desired, the bleed valve 148 may be incorporated in the open port of valve 142.

The three valves 118, 124 and 134 are interconnected, as indicated by the broken lines in FIG. 10, for simultaneous adjustment to each of their respective three positions. The left hand position illustrated is achieved by manual manipulation of the control level 150. When the control lever is rotated counterclockwise to move the interconnected valves to their intermediate position, a cam follower roller 152 connected to the valve 134 for movement therewith engages the surface of a rotary cam 154 mounted on the drive shaft 90 of the valve spool 84. The cam is provided with a detent 156, and when this detent is rotated into registry with the cam follower roller, the latter moves into the detent, whereupon the three interconnected valves are moved leftward to their right hand positions, by the force exerted by compression spring 158.

Upon further rotation of the cam 154, the follower 152 is retracted from the detent 156 to the surface of the cam, whereupon the three interconnected valves are moved toward the right to their intermediate positions, against the resistance of the spring 158. Movement of the valves fully rightward to their left hand positions is effected by clockwise rotation of the lever 150.

The operation of the reciprocating conveyor described hereinbefore is as follows:

Let it first be assumed that it is desired to operate the conveyor to unload material from the trailer, i.e. toward the bottom in FIG. 1 through the open rear end of the trailer. The lever 150 is operated to position the tree interconnected valves 118, 124 and 134 in their left hand positions as illustrated in FIG. 10, the two-way valve 110 is adjusted to the position also illustrated in FIG. 10, and the hydraulic pump 114 is driven by activation of its drive motor.

Hydraulic fluid under pressure is delivered from the pump 114 through the valve 118 and conduit 112, thence through the valve 110 and conduit 108, thence through the annular passageway 104 and longitudinal passageway 106 in the valve spool 84, thence through the conduit 94 to the piston rod end of cylinder 72. It is to be noted that the piston rod 68 associated with this cylinder is fully extended. Accordingly, fluid pressure thus applied causes said piston rod to fully retract.

As the piston rod of cylinder 72 retracts, hydraulic fluid is forced from the piston head side of said cylinder through the common conduit 132 and into the piston head ends of the other three cylinders 70, 74 and 76. Since all of the cylinders are of the same dimensions, the piston rods associated with said three cylinders are caused to be extended from the positions illustrated in FIG. 10, each by a distance of about one-third their full travel distance. Thus, the piston in cylinder 70 will have been extended upward to a position about two-thirds the distance from the upper end of its full stroke; the piston in cylinder 74 will have been extended upward to its maximum position of extension; and the piston in cylinder 76 will have been extended upward to a position about one-third the distance from its uppermost position of extension.

It is to be noted that the retraction of the piston rod through the full length of its cylinder 72 occurs at a speed three times that of the simultaneous extension of the piston rods from the other three cylinders. Thus, in accordance with this invention, the simultaneous extension of the piston rods of cylinders 70, 74 and 76 effects simultaneous movement of the connected slats 22, 26 and 28 in the conveying direction of unloading material from the trailer (FIG. 2). Simultaneously, the slats 24 connected to the piston rod of cylinder 72 are being moved in the opposite direction at three times the speed. Since three slats of each group are conveying the material in the outfeed direction, while only one slat of each group is retracting at the higher speed, no interruption of movement of the material in the conveying direction occurs. Accordingly, the outfeeding of material from the trailer progresses smoothly at a uniform rate of speed.

As the pistons in the three cylinders thus are moved in the extending direction, hydraulic fluid is forced from the piston rod ends thereof, through the conduits 94 and into the common passageway 96 in the valve spool, thence outward through the axial passageway 98 and conduit 100, thence through the valve 110 and conduit 120, through the three-position valve 124 to the inlet of the hydraulic motor 112. The output shaft of the motor thus is caused to rotate, thereby simultaneously rotating the valve spool 84. This rotation is clockwise in the configuration illustrated in FIG. 10.

Let it be assumed that the expulsion of hydraulic fluid from the three extending cylinders 70, 74 and 76, during their one-third increments of extension, is sufficient to drive the motor 122 to rotate the spool 84 through 90°. Accordingly, the longitudinal passageway 106 in the spool is rotated into registry with the passageway 92 in the valve body 82 communicating through the conduit 94 with the rod end of cylinder 74. It will be remembered that the piston in this cylinder has been moved fully upward to the position of full extension of its piston rod.

It is to be observed from FIG. 9 that before the longitudinal passageway 106 has moved out of registry with the passageway 92 communicating with cylinder 72, it will have moved into partial registry with the passageway 92 communicating with cylinder 74. This arrangement allows a smooth transition of fluid pressure between cylinders.

Hydraulic fluid under pressure from the pump 114 now is impressed upon the rod end of the piston in cylinder 74, to effect full downward retraction of said piston and rod, and simultaneous retraction of the conveyor slats 26 connected thereto. The hydraulic fluid expressed from cylinder 74 is delivered to the piston head ends of the remaining cylinders 70, 72 and 76, to effect extension of the associated piston rods by the one-third increment previously explained.

The foregoing operation continues, with rotation of the control valve spool 84 and consequent sequential retraction of each piston rod after it reaches its position of full extension and simultaneous one-third extension of the piston rods of the remaining three cylinders.

By this mode of operation, the load on the conveyor in the trailer is moved in the unloading direction at a substantially uniform rate of speed.

Each time the piston in cylinder 76 approaches its limit of full extension of its piston rod 68, the arm 146 engages and switches the valve 142 to its open position. This allows any excess fluid in the cylinder system to be relieved to tank 116. In the event the cylinder system produces a substantial volume of excess fluid, a valve 142 and arm 146 may be associated with more than one of the cylinders. Bleed valve 140 insures that the cylinder system is full of fluid at all times.

Let it now be assumed that it is desired to move all of the conveyor slats simultaneously in the unloading direction momentarily to initiate movement of a load which otherwise is difficult to start. The control lever 150 is rotated counterclockwise to move the three valves 118, 124 and 134 to the intermediate position. In this position the cam roller 152 is brought into engagement with the surface of cam 154, as previously explained.

In the intermediate positions of the three valves, the piston head ends of all of the cylinders are connected through common conduit 132, valve 134 and conduit 130 to the motor 122. As the spool 84 of the control valve rotates, the piston rod end of each cylinder is subjected to fluid pressure to effect full retraction of each piston rod in sequence. When all of the piston rods have been fully retracted, the cam detent 156 is brought into registration with the cam follower roller 152. Thereupon the three valves are moved, under the influence of spring 158, to the leftwardmost position of adjustment. In this position, fluid pressure from pump 114 is applied through conduit 136, valve 134 and common conduit 132 to the piston head ends of all of the cylinders, causing all of the piston rods to extend simultaneously. Fluid expressed from the piston rod ends of all of the cylinders is returned to tank 116 through the control valve, conduits 112 and 120, valves 118 and 124 and conduit 126.

During the foregoing sequential retraction of the piston rods and the subsequent simultaneous full extension of the piston rods, the hydraulic motor 122 has been rendered inoperative, as will be understood. Thus, upon full extension of all of the piston rods, the fluid pressure from pump 114 increases sufficiently to cause opening of the relief valve 128 to divert the oil pressure to the motor. Rotation of the motor effects simultaneous rotation of the cam 154, whereupon the cam follower roller is moved outward from the detent to the surface of the cam. The three valves thus are moved toward the right to their intermediate position, whereupon the foregoing sequence of operations is repeated. This sequence may be repeated as often as is necessary to initiate movement of the load, after which the valve lever 150 is rotated clockwise to return the three valves to the normal position illustrated in FIG. 10.

With the valves returned to the normal position illustrated, rotation of the spool 84 of the control valve tests the condition of each cylinder and eventually reestablishes the normal sequence of operation wherein three of the four piston rods always move simultaneously in the unloading direction while the fourth piston rod moves rapidly in the opposite direction.

It is to be noted that the bleed valve 140 continuously meters fluid pressure from the pump 114 to the piston head ends of all of the cylinders. Since the cross sectional area of the piston head surface is greater than the opposite, piston rod surface, the pistons tend to creep slowly in the extending direction of the piston rods. Further, any excess volume of fluid in the cylinder system periodically is returned to tank 116 upon full extension of the piston rod associated with the cylinder 76 and consequent shifting of the valve 142 to the open position. These provisions assist in the reestablishment of the proper normal sequence of operations.

It will be apparent that conveyor speed may be adjusted by varying the speed of rotation of the pump 114. This may be achieved by utilizing a variable speed drive motor, or by appropriate variations in the gear, sprocket, or other coupling of the motor to the pump.

Let it now be assumed that it is desired to load material into the trailer. For this purpose the two-way valve 110 is moved toward the left to the alternate position from that illustrated in FIG. 10, while retaining the interconnected three-position valves in the position illustrated. Hydraulic fluid under pressure from the pump 114 thus is directed through the conduit 112 and the switched valve 110 to the conduit 100 communicating with the axial passageway 98 in the valve spool, thence through the common passageway 96 and the registering three passageways 92 in the valve body 82 and the connected conduits 94 into the rod ends of the three cylinders connected thereto.

It will be apparent that if the spool valve is in the position illustrated in FIG. 10, fluid pressure to the cylinders 70, 74 and 76 cannot effect retraction of their associated piston rods, since the piston in the cylinder 72 is already fully extended and the piston head ends of the other three cylinders have no return to tank 116. Accordingly, fluid pressure from the pump increases sufficiently to open the relief valve 128 and divert the fluid pressure through the motor 122. Activation of the motor causes rotation of the spool 84. This rotation tests the condition of each cylinder and eventually establishes the sequence of operation described hereinbefore, but in the reverse direction wherein three of the four piston rods always are moving simultaneously in the retracting direction to effect loading of material into the trailer.

It will be apparent to those skilled in the art that various changes may be made in the size, shape, type, number and arrangement of parts described hereinbefore, without departing from the spirit of this invention.

Having now described my invention and the manner in which it may be used, I claim:

1. A reciprocating conveyor, comprising:
   (a) a frame,
   (b) a plurality of elongated slat members having longitudinal side walls and spaced apart laterally on the frame,
   (c) an elongated flexible sealing strip secured to the longitudinal side wall of one of each adjacent pair of slat members and including a resilient portion extending angularly upward into resilient sliding engagement with the confronting longitudinal side wall of said other adjacent slat member of the pair, and
   (d) drive means on the frame engaging the slat members for reciprocating them longitudinally.

2. A reciprocating conveyor, comprising:
   (a) a frame,
   (b) a plurality of elongated slat members arranged side-by-side on the frame, each slat member being of substantially C-shaped in cross section providing an upper load-supporting wall, laterally spaced side walls and a pair of laterally spaced bottom flanges projecting inward one from each side wall,
   (c) guide means for each slat member having a top surface underlying and supporting said upper load-supporting wall, and laterally spaced side surfaces at least portions of which are spaced apart a distance greater than the spacing between said bottom flanges, the vertical distance between said top surface and said portions of the side surfaces being less than the vertical distance between the under surface of the upper wall of the slat member and the inner surface of the bottom flanges of the slat member, whereby the latter is longitudinally movable freely relative to the guide means,
   (d) attaching means secured to the guide means of each slat member and extending downward between and below the bottom flange of the slat member for attachment to the frame, and
   (e) drive means on the frame engaging the slat members for reciprocating them longitudinally relative to the guide means.

3. The reciprocating conveyor of claim 2 wherein:
   (a) each attaching means comprises an elongated support member secured to the frame and extending parallel to the associated slat member, and
   (b) each guide means is of substantially U-shape in cross section defining said top and side surfaces and overlying the associated support member, (c) the side surfaces of each slat member and said portions of the side surfaces of the guide means being laterally resilient one relative to the other, whereby the slat member is engageable with the guide means by downward force on the slat member sufficient to cause the bottom flanges thereof to snap downward over said portions of the side surfaces of the guide means.

4. The reciprocating conveyor of claim 2 wherein:
(a) the frame includes a plurality of longitudinally spaced transverse frame members,
(b) each attaching means comprises an elongated support member secured to the transverse frame members and extending parallel to the associated slat member,
(c) each guide means is of substantially U-shape in cross section defining said top and side surfaces and overlying the associated support member,
(d) the side walls of each slat member and said portions of the side surfaces of the guide means being laterally resilient one relative to the other, whereby the slat means is engageable with the guide means by downward force on the slat member sufficient to cause the bottom flanges thereof to snap downward over said portions of the side surfaces of the guide means, and
(e) each guide means includes a pair of longitudinally spaced lugs on each side surface extending inward under the associated support member, the longitudinal spacing between the lugs of each pair being at least as great as the width of the associated transverse frame member, whereby to abut the opposite sides of the latter and prevent longitudinal displacement of the guide means relative thereto.

5. The reciprocating conveyor of claim 4 wherein the side walls of each guide means are laterally resilient for spreading the lugs apart a distance greater than the width of the associated support member.

6. A reciprocating conveyor, comprising:
(a) a frame,
(b) at least one group of at least three elongated slat members mounted adjacent each other on the frame, and
(c) adjustable drive means on the frame engaging each slat member and operable in one position of adjustment to move more than half of the number of slat members in each group simultaneously in a conveying direction and to move the remainder of the slat members of each group in the opposite direction at a higher rate of speed, and in a second position of adjustment to move all of the slat members of each group simultaneously in a conveying direction and to move each slat member of each group sequentially in the opposite direction, the adjustable drive means comprising:
(1) an extensible fluid pressure piston-cylinder unit for each slat member of a group, each unit being connected at one end to the frame and at the opposite end to the associated slat member for reciprocating the latter,
(2) a fluid pressure control valve including relatively movable first and second valve members, the first member having a plurality of first passageways each communicating with a different one of the cylinders of said units, and a second member having a common second passageway communicating simultaneously with more than half of the first passageways and a third passageway communicating with the remaining first passageways,
(3) means for moving one of the first and second valve members relative to the other for communicating the second and third passageways selectively with different ones of the first passageways,
(4) a source of fluid pressure for said piston-cylinder units, and
(5) means for communicating the third passageway with the source of fluid pressure and the second passageway with exhaust.

7. The reciprocating conveyor of claim 6 wherein the control valve member moving means comprises a fluid pressure motor the outlet of which communicates with exhaust and the inlet of which communicates with said second passageway.

8. The reciprocating conveyor of claim 7 including adjustable valve means for communicating the ends of all of the cylinders opposite their communication with the control valve selectively with the inlet of the fluid pressure motor when the source of fluid pressure communicates with the third passageway and with the source of fluid pressure when the latter is closed from the control valve.

9. The reciprocating conveyor of claim 8 including cam means movable with the fluid pressure motor, and cam follower means on the adjustable valve means engaging the cam means for moving the adjustable valve means between said selective positions.

10. The reciprocating conveyor of claim 7 wherein the communicating means includes adjustable valve means for communicating the second and third passageways selectively with the source of fluid pressure and exhaust.

11. The reciprocating conveyor of claim 10 including second adjustable valve means for communicating the ends of all of the cylinders opposite their communication with the control valve selectively with the inlet of the fluid pressure motor when the source of fluid pressure communicates with one of the second and third passageways and with the source of fluid pressure when the latter is closed from the control valve.

12. The reciprocating conveyor of claim 11 including cam means movable with the fluid pressure motor, and cam follower means on the second adjustable valve means engaging the cam means for moving the second adjustable valve means between said selective positions.

13. A reciprocating conveyor, comprising:
(a) a frame,
(b) at least one group of at least three elongated slat members mounted adjacent each other on the frame, and
(c) adjustable drive means on the frame engaging each slat member and operable in one position of adjustment to move more than half of the number of slat members of each group simultaneously in a conveying direction and to move the remainder of the slat members of each group in the opposite direction at a higher rate of speed and in a second position of adjustment to move all of the slat members of each group simultaneously in a conveying direction and to move each slat member of each group sequentially in the opposite direction, the adjustable drive means comprising:
(1) an extensible fluid pressure piston-cylinder unit for each slat member of a group, each unit being connected at one end to the frame and at the opposite end to the associated slat member for reciprocating the latter, (2) a fluid pressure control valve including relatively movable first and second valve members, the first member having a plurality of first passageways each communicating with a different one of the cylinders of said units, and the second valve member having a common second passageway communicating simultaneously with more than half of the first passageways and a third passageway communicating with the remaining first passageways, (3) a source of fluid pressure for said piston-cylinder units, (4) adjustable valve means for communicating the second and third passageways selectively with the source of fluid pressure and exhaust, (5) a fluid pressure motor connected to one of the first and second valve members for moving said one valve member relative to the other for communicating the second and third passageways selectively with different ones of the first passageways, the outlet of the fluid pressure motor communicating with exhaust and the inlet of the motor communicating selectively with said second and third passageways, (6) second adjustable valve means for communicating the ends of all of the cylinders opposite their communication with the control valve selectively with the inlet of the fluid pressure motor when the source of fluid pressure communicates with one of the second and third passageways and with the source of fluid pressure when the latter is closed from the control valve, and (7) cam means movable with the fluid pressure motor, and cam follower means on the second adjustable valve means engaging the cam means for moving the second adjustable valve means between said selective positions.

14. A reciprocating conveyor, comprising:
(a) a frame,
(b) at least one group of at least three elongated slat members mounted adjacent each other on the frame, each slat member being of substantially C-shape in cross section providing an upper load supporting wall, laterally spaced side walls and a pair of laterally spaced bottom flanges projecting inward one from each side wall and including guide means for each slat member having a top surface underlying and supporting said upper load supporting wall, and laterally spaced side surfaces at least portions of which are spaced apart a distance greater than the spacing between said bottom flanges, the vertical distance between said top surface and said portions of the side surfaces being less than the vertical distance between the under surface of the upper wall of the slat member and the inner surface of the bottom flanges of the slat member, whereby the latter is longitudinally movable freely relative to the guide means, and attaching means secured to the guide means of each slat member and extending downward between and below the bottom flanges of the slat member for attachment to the frame, and (c) adjustable drive means on the frame engaging each slat member and operable in one position of adjustment to move more than half of the number of slat members of each group simultaneously in a conveying direction and to move the remainder of the slat members of each group in the oposite direction at a higher rate of speed, and in a second position of adjustment to move all of the slat members of each group simultaneously in a conveying direction and to move each slat member of each group sequentially in the opposite direction.

15. The reciprocating conveyor of claim 14 wherein
(a) the frame includes a plurality of longitudinally spaced transverse frame members,
(b) each attaching means comprises an elongated support member secured to the transverse frame members and extending parallel to the associated slat member,
(c) each guide means is of substantially U-shape in cross section defining said top and side surfaces and overlying the associated support member,
(d) the side walls of each slat member and said portions of the side surfaces of the guide means being laterally resilient one relative to the other, whereby the slat member is engageable with the guide means by downward force on the slat member sufficient to cause the bottom flanges thereof to snap downward over said portions f the side surfaces of the guide means, and
(e) each guide means includes a pair of longitudinally spaced lugs on each side surface extending inward under the associated support member, the longitudinal spacing between the lugs of each pair being at least as great as the width of the associated transverse frame member, whereby to abut the opposite sides of the latter and prevent longitudinal displacement of the guide means relative thereto.

16. The reciprocating conveyor of claim 15 wherein the side walls of each guide means are laterally resilient for spreading the lugs apart a distance greater than the width of the associated support member.

* * * * *